July 7, 1964 J. V. MARTENS 3,140,358

ELECTRICAL SIGNALLING SYSTEM

Filed Aug. 20, 1959 3 Sheets-Sheet 1

Inventor
J.V.MARTENS
By Albert Reiss
Attorney

July 7, 1964 J. V. MARTENS 3,140,358

ELECTRICAL SIGNALLING SYSTEM

Filed Aug. 20, 1959 3 Sheets-Sheet 2

Inventor
J.V.MARTENS
By Albert ...
Attorney

July 7, 1964 J. V. MARTENS 3,140,358

ELECTRICAL SIGNALLING SYSTEM

Filed Aug. 20, 1959 3 Sheets-Sheet 3

Inventor
J.V. MARTENS
By Albert Perris
Attorney 3,140,358

ELECTRICAL SIGNALLING SYSTEM

Jean Victor Martens, Antwerp, Belgium, assignor to International Standard Electric Corporation, New York, N.Y., a corporation of Delaware Filed Aug. 20, 1959, Ser. No. 835,010
Claims priority, application Netherlands Sept. 3, 1958
10 Claims. (Cl. 179—90)

The invention relates to an electrical signalling system and in particular to voice frequency telephone dialling systems.

Its principal object is to provide a simple and economical system of the above character which is substantially independent of the subscriber line characteristics.

Particularly for telephone subscriber keysending schemes, the use of A.C. signals of distinct frequencies to characterize the digits of a wanted number has advantages over the use of characteristic D.C. signals. The main drawback of most D.C. signalling schemes is that the currents evidently depend on the D.C. resistance of the subscribers lines the length of which usually vary within rather wide limits. On the other hand, when A.C. signals or characteristic frequencies are used, if one tries to place the A.C. sources at the exchange, just as the D.C. source is also at the exchange, in order to simplify the equipment at the substations, the use of a variable tuned circuit at the substation to provide characteristic signals is far from constituting an attractive solution since the characteristic of the line will again intervene. With the usual variations in the length of the subscribers lines, a good discrimination between the digital signals is practically impossible.

For A.C. keysending schemes, one is therefore led to envisage the location of at least one oscillator in the substation equipment. In this connection, two primary requirements immediately arise, i.e., the size of the equipment at the subset and the cost thereof cannot be too large. Moreover, the necessary power to operate the substation oscillators should be provided by the exchange through the subscribers two-wire line. So far, it has been very difficult to satisfy such requirements, and many tentative solutions have envisaged mechanical oscillators at the substations. Unfortunately, these have various limitations and they do not appear to have been widely used.

The advent of the transistor has permitted substation oscillators which may satisfy the above two primary requirements. Nevertheless, there are still many other requirements to be satisfied if an A.C. subscriber key sending scheme using oscillators at the substations is to constitute a satisfactory solution.

First of all, though the transistor itself is small, the oscillator design should nevertheless be such that the number and size of the additional elements should be reduced to a minimum in order that the complete oscillator should occupy only a very small volume and be of a reasonable price. The maintenance of the substation equipment should be kept to a minimum which means that the design of the oscillator should be such that the transistor will be operated under conditions which are as remote as possible from the maximum rating values of the transistor, so that one may expect a practically unlimited life for the transistor. The oscillator design should be such that its performance is substantially independent of the length of the subscribers' lines. This bears both on the amplitude of the oscillations and on their frequency stability. It is a particularly stringent requirement in view of the substantial differences in the lengths of the subscriber's line.

The possibility of interfering signals causing undesired operations of the tuned receivers located at the exchange should be extremely small, the possibility of a complete imitation of one of the characteristic predetermined signals should be practically non-existent, and there should be no possibility of confusing a faulty signal with one of the correct signals. Substantial marginal conditions for the characteristic signals should preferably be avoided. Also, if more than one oscillator is used at the subset, there should be no interference between the two devices.

An object of the invention is to realize a new electrical signalling system using A.C. energy and of the type defined above, which satisfies the various requirements previously listed, principally due to a novel design of the oscillator equipment.

In accordance with the first characteristic of the invention, an electrical signalling system as defined above is characterised in that said transmitting station includes at least two oscillators each using a single three-terminal active amplifying device, e.g., transistor, with a tuned three-terminal regenerative passive circuit coupled between two terminals of said device, e.g., emitter and base electrodes, the third terminals of said devices and circuits in both oscillators being galvanically coupled respectively to the first and to the second wire of said line during transmission of said A.C. signals whereupon said oscillators are made simultaneously operative to generate a combination of A.C. signals. The signalling system is further characterized by selective tuning means which are available to select particular combinations, with the D.C. output impedances of said oscillators being relatively high to create a decreased D.C. current through said line when said oscillators are branched thereon whereby this D.C. signal may be used at said receiving station to effectively connect receivers tuned to said A.C. signals. Another characteristic resides in the arrangement wherein the A.C. output impedances of said oscillators are also high at the frequencies generated.

The above system has the outstanding advantage that the output circuits of the oscillators do not include a tuned circuit. If at least two oscillators have to be used and if they include an anti-resonant tank circuit at their output, they would have to be connected in series which would complicate the feeding of the two oscillators from the exchange. With the above arrangement however, since the output impedances of the oscillators are high, not only at the generated frequencies but also at the other frequencies which may be produced by the associated oscillators, a parallel connection becomes feasible.

Also, since the resonant circuit is substantially decoupled from the line, the factors which determine the frequency and the depth of oscillation will scarely be affected by the line characteristics. Moreover, the output impedance of the oscillators is also quite high for D.C. current. Consequently, the current drain on the central battery at the exchange will be very small and since the D.C. output resistance of the oscillators branched in parallel on the line will provide the main part of the total loop resistance, the D.C. current supplied to the oscillator will be practically independent of the variations in the D.C. loop resistance.

The fact that the mere connection of the oscillators across the line, when the latter has been looped preparatory to an outgoing call, will substantially reduce the D.C. current through the loop is an added advantage since it is the simplest way to create a signalling condition which may be used to take care that only during the actual sending time, will the tuned receivers connected at the other end of the line be in an operative condition ready to react to the A.C. signals at the frequency to which they are tuned.

A possible drawback of oscillators which are designed so that their output circuit is largely decoupled from the resonant circuit determining the frequency of operation, is that such oscillators are liable to produce a certain amount of harmonics. The generation of harmonics is obviously undesirable since it becomes more difficult to design the tuned receivers so that they will not react to harmonics generated by the oscillators, but will only react to the fundamental frequencies.

Another object of the invention is to obviate the disadvantages of the harmonics produced by such a type of oscillators.

In accordance with another characteristic of the invention, an electrical signalling system as characterised above, is further characterised in that the various predetermined signalling frequencies are used in constant combinations of at least two simultaneous signals of distinct frequencies, and that the frequency bandwidth of these predetermined frequencies is restricted to less than an octave.

Thus, with the above system, the harmonic of one of the predetermined signalling frequencies can never correspond more or less to another of the predetermined frequencies. If only one frequency was being sent at a time, this result could also be achieved but with the disadvantage that the spacing between the various frequencies would have to be much narrower since there would be a larger number of these. For instance, if ten distinct signals have to be transmitted, a two-out-of-five constant code scheme compares favourably with a one-out-of-ten scheme since only half the number of frequencies is required, whereby their spacing can be larger with a consequent simplification in the design of the tuned receivers since the discrimination becomes easier. In case more than ten digital signals must be provided for, e.g., if five additional signals for special services are to be foreseen, the difference between a two-out-of-six constant code scheme and a one-out-of-fifteen scheme becomes even greater. Taking the extreme case where the fifteen frequencies occupy one octave (in fact this would have to be less) and assuming that they form a geometric progression, a change of less than 4% in any frequency will already produce one of the two adjacent ones, whereas with six frequencies used two at a time, such a percentage becomes greater than 12%.

From the point of view of immunity against spurious signals, a two-out-of-five or a two-out-of-six frequency signalling scheme in combination with a single D.C. signal always generated with any combination of frequencies, is particularly advantageous. The five or six frequencies may be voice frequencies which will not suffer appreciable attenuation. For a complete imitation of a characteristic signal formed by a combination of two distinct frequencies with a particular D.C. signal, it would therefore be necessary that all three should be simultaneously and successfully imitated. Since there is only a single D.C. signal the probability of imitation is extremely slight and there remain only spurious A.C. signals such as transient voltage kicks and inductively coupled signals which might imitate the predetermined voice frequency signals. Due to the combination of at least two of these, the total number of voice frequencies which are used is smaller for a given number of distinct signals and two frequencies should simultaneously be imitated. It is therefore clear that the probability of such an occurrence is practically negligible. In the event of a false code, this can of course be readily detected since it will mean that more or less than two of the tuned receivers will be operated assuming for example that a two-out-of-five or a two-out-of-six voice frequency signalling scheme is used.

The above and other objects and characteristics of the invention and the best manner of attaining them will be best understood from the following description of detailed embodiments of the invention to be read in conjunction with the accompanying drawings comprising FIGS. 1 to 6 wherein.

Figure 1:
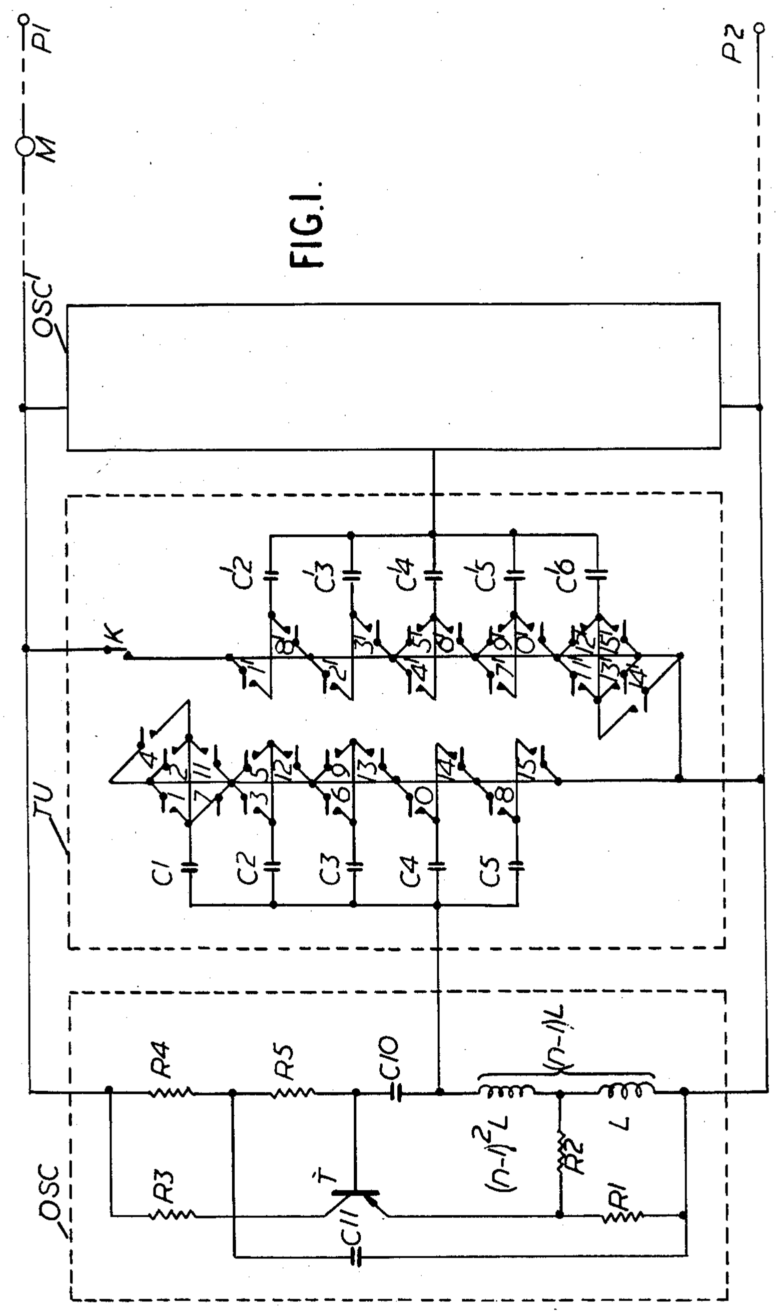
FIG. 1 shows a circuit diagram of the oscillator part of a telephone subset designed in accordance with the invention.

Referring to FIG. 1, the latter shows voice frequency signalling equipment to be included in a telephone subset. This comprises two oscillators OSC and OSC′ which are identical, whereby only OSC has been detailed, OSC′ being merely shown by a block. In addition, the figure shows a tuning unit TU consisting of tuning condensers and contacts, which unit is used to tune the two oscillators to the required frequencies. The oscillators are capable of generating combinations of two frequencies out of six and the six frequencies may for example be voice frequencies starting with 1380 cycles per second and increasing by steps of 120 cycles per second to form an arithmetic progression. Since for any selective signal, the two oscillators are always operated to produce a combination of two frequencies out of the six, there are therefore fifteen signals. Ten of these may already be obtained with five out of the six frequencies, and may correspond to the ten digital signals, while the remaining five combinations of two frequencies using the sixth frequency, may then constitute the additional signals for special services to the subscriber, such as a request for the intervention of an operator.

It will be noted that the set of six frequencies offers the advantage that the bandwidth is relatively small and substantially less than one octave. As a consequence, the harmonics of the signalling frequencies are completely harmless to the receivers which will be located at the exchange to react to the transmitted frequencies.

Preferably, the level of both frequencies generated by the two oscillators OSC and OSC′ will be roughly the same as the average speech level, say about 0.04 milliwatt. As a consequence of this choice any group of circuits on which speech interference is within reasonable limits, may be fitted with the proposed type of signalling. As shown in FIG. 1, during selective signalling, the two oscillators are branched in parallel on the subset line terminals $P_1$ and $P_2$. This connection may be made directly via suitable switching contacts (not shown) or alternatively, the two paralleled oscillators OSC and OSC′ may be connected to terminal $P_1$ and $P_2$ in series with the microphone M. These connections to terminals $P_1$ and $P_2$, as indicated by the dotted lines, may of course be made through other conventional elements of the subset.

Though the two oscillators may normally be disconnected from the line terminals and be connected thereto through a suitable switching contact every time a digit is keyed, the connection shown in FIG. 1 in series with the microphone circuit offers the possible advantage that the output currents from the oscillators will then be transmitted in exactly the same way as speech currents from the microphone and profit will be taken of all precautions concerning side tone elimination.

If the oscillator output impedances are kept high, a further advantage may be derived from the series connection with the microphone, since the signalling system is then protected against interference from microphone currents without any special switching being required.

As shown in FIG. 1, terminal $P_1$ is normally galvanically connected to terminal $P_2$ through the circuit of the microphone M in series with the normally closed break contact *k*. Thus, as shown, the two oscillators are normally short-circuited and are inoperative. The contact *k* is a common contact which is coupled mechanically to all the keys (not shown) of the subset used to produce the selective voice frequency signals. Hence, during a call, whenever a key is depressed contact $k$ will be opened, the two oscillators will be supplied with current from the exchange battery through the loop circuit and will each oscillate at the frequencies to which they have been tuned in accordance with the particular key which has been depressed. The high output impedance of each oscillator will ensure a suitable decoupling between the two parallel oscillators, and moreover, the high D.C. output resistance of the oscillators will considerably limit the current drain with the advantages already explained.

As shown by FIG. 1 the active element of the oscillator OSC is the transistor T which may be a PNP junction type transistor. One output terminal of the oscillator connected to terminal $P_2$ leads to the emitter electrode of the transistor T through the resistor $R_1$, while the other output terminal of the oscillator is connected to the collector electrode through resistor $R_3$, and to the base electrode through a resistance formed by resistors $R_4$ and $R_5$ in series.

The regenerative coupling of the oscillator is obtained by a tuned circuit connected between the emitter and the base electrodes of the transistor. The collector circuit is then used as an output circuit.

As already explained previously, this will ensure a high degree of decoupling between the collector and the other electrodes which will in particular lead to a freqquency which is scarely affected by the line characteristics.

This regenerative coupling circuit between emitter and base consists in a resistor $R_2$ connected between the emitter and the intermediate point of a two-winding auto-transformer, the first winding of which has an inductance L and the second winding of which has an inductance $(n-1)^2L$. This first winding is connected to output terminal $P_2$, while the second winding is connected to the base electrode of T through condenser $C_{10}$.

This condenser $C_{10}$ forces the D.C. current supplied from terminal $P_1$ through the resistors $R_4$ and $R_5$ in series to reach only the base electrode of transistor T. On the other hand, the path for the D.C. supply to the base electrode is prevented from constituting an additional feedback circuit between the collector and the base electrodes due to the provision of a decoupling condenser $C_{11}$ connected between terminal $P_2$ and the junction point of resistors $R_4$ and $R_5$. Thus, the collector electrode is fully decoupled from the remaining two electrodes to ensure an optimum stability of operation of the oscillator.

Assuming perfect coupling between the two windings of the auto-transformer, the mutual inductance is equal to $(n-1)L$ whereby the total inductance of the two windings in series aiding connction is equal to $n^2L$, where $n$ represents the step-up voltage ratio from the emitter to the base.

The various tuning condensers such as $C_{1/5}$ for the oscillator OSC and $C'_{2/6}$ for the oscillator OSC′ have normally one of their plates commoned to the upper end of the auto-transformer in the corresponding oscillator, and the other plates of the condensers may be connected to terminal $P_2$ through contacts of the subset keys. In this way, one particular condenser such as $C_1$ may be branched across the two windings of the auto-transformer in series. The oscillator will then produce an output frequency corresponding to the anti-resonant frequency defined by $n^2L$ and $C_1$.

The arrangement shown assumes that there are only two make contacts per key and if digit one is to be sent for example, the corresponding key (not shown) will be depressed with the result that both the make contacts 1 and 1′ will be closed effectively connecting the tuning condensers $C_1$ and $C'_2$ respectively to the oscillators OSC and OSC′ which will therefore respectively produce the two angular frequencies $w_1$ and $w_2$ corresponding respectively to the condensers $C_1$ and $C'_2$.

The pairs of frequencies corresponding to the various digital keys may be determined for instance from the following table:

| | $w_6$ | $w_5$ | $w_4$ | $w_3$ | $w_2$ | $w_1$ |
|---|---|---|---|---|---|---|
| 1 | 0 | 0 | 0 | 0 | 1 | 1 |
| 2 | 0 | 0 | 0 | 1 | 0 | 1 |
| 3 | 0 | 0 | 0 | 1 | 1 | 0 |
| 4 | 0 | 0 | 1 | 0 | 0 | 1 |
| 5 | 0 | 0 | 1 | 0 | 1 | 0 |
| 6 | 0 | 0 | 1 | 1 | 0 | 0 |
| 7 | 0 | 1 | 0 | 0 | 0 | 1 |
| 8 | 0 | 1 | 0 | 0 | 1 | 0 |
| 9 | 0 | 1 | 0 | 1 | 0 | 0 |
| (1)0 | 0 | 1 | 1 | 0 | 0 | 0 |
| 11 | 1 | 0 | 0 | 0 | 0 | 1 |
| 12 | 1 | 0 | 0 | 0 | 1 | 0 |
| 13 | 1 | 0 | 0 | 1 | 0 | 0 |
| 14 | 1 | 0 | 1 | 0 | 0 | 0 |
| 15 | 1 | 1 | 0 | 0 | 0 | 0 |

Condensers $C_2$ and $C'_2$ have equal values and the same applies to the pairs of condensers $C_3$ and $C'_3$, etc. It will be observed that only four tuning condensers out of the six need by duplicated for the two oscillators. For the remaining two frequencies it is sufficient to use one condenser with one oscillator only, i.e., only the oscillator OSC uses condenser $C_1$ and only the oscillator OSC′ uses condenser $C'_6$, whereby each of the two oscillators need only be capable of producing five out of the six frequencies.

It will be observed from FIG. 1, that the upper winding of the auto-transformer does not pass any D.C. current whereas some D.C. current flows through the lower winding. In these circumstances, it is advantageous to obtain the voltage step-up by way of an auto transformer which requires a lesser total number of turns than an ordinary transformer with two separate windings. This permits a reduction in the size of the coil which is particularly important for an oscillator arrangement which must be as small as possible. Preferably, also the step-up ratio of the transformer will be chosen in the neighbourhood of two to one. This preferred value has the double advantage of increasing the frequency stability of the oscillator and also of decreasing the D.C. current flowing through the lower winding of the auto-transformer. This will be explained immediately below.

The transistor oscillator with a regenerative coupling between emitter and base as shown, is from a structural point of view somewhat similar to the so-called cathode coupled vacuum tube oscillators in which the regenerative coupling is obtained between the cathode and the grid circuits of an amplifying tube. In this connection one may refer for example to the Belgian Patent No. 526,077. The design of a transistor oscillator with a regenerative coupling between emitter and the base is however quite different since one must now consider power rather than voltage, the latter being only applicable in the case of the grid circuit of a vacuum tube whose impedance is always very high.

A simplified A.C. analysis of the oscillator circuit will now be made in which the effect of the intrinsic base and emitter resistances of the transistor T will be neglected. It will also be assumed that the upper terminal of the auto transformer is directly connected to the base of the transistor T. Then, the only transistor parameter which need be considered in the simplified analysis is $b$, the current gain for a transistor operated in grounded emitter fashion. In other words, $b$ represents the ratio between the emitter and the base currents. It will be further assumed that resister $R_5$ is sufficiently high to be neglected. Then, if R represents the base impedance, i.e., the impedance between the base electrode of the transistor and ground, assuming that ground is connected to terminal $P_2$, it will be given by:

$$R=R_1(b-n) \qquad (1)$$

The above relation is obtained by assuming that the base voltage is substantially equally to the emitter voltage and by noting that the current circulating in resistor $R_2$ is equal to $n$ times the base current. In this case, the feedback loop gain of the oscillator can also be calculated since if R is the base resistance, the resistance seen across the winding of inductance L will be equal to $R/n^2$. To ensure oscillations, the feedback loop gain should at least be equal to unity and using the value of R given by (1) the oscillation condition may be written as $$\frac{(b-n)(n-1)}{n^2} \geq \frac{R_2}{R_1} \tag{2}$$

For an efficient use of the transformer, it is desirable that the D.C. current flowing through its lower winding should be as small as possible. The D.C. current may evidently be completely eliminated by associating the winding of inductance L in series with a further condenser, but this means an extra element which it is desirable to avoid when space is at a premium. It is clear that the D.C. current through the winding of inductance L will become smaller as the value of the resistor $R_2$ is increased. Also, the higher this resistance, the greater will be the decoupling of the anti-resonant circuit formed by the auto-transformer shunted by a tuning condenser, from the external resistive circuit. Therefore, it is of interest that $R_2$ should be as high as possible while the necessary condition to obtain oscillations is still satisfied. The function of $n$ included in (2) may reach a maximum value given by $$\frac{(b-1)^2}{4b} \tag{3}$$

when $$n=\frac{2b}{b+1} \tag{4}$$

With currently available transistors, $b$ can be much greater than unity, so that bearing in mind the approximations made for the above analysis, the preferred value for $n$, the step-up voltage ratio of the transformer is the order of 2 and the maximum value which the ratio between $R_2$ and $R_1$ should not exceed, will then be substantially equal to $b/4$.

A more complete analysis should of course take into account the effect of the transistor parameters other than $b$, but these will in general be small. One effect which is not negligible however is the equivalent shunt resistance across the transformer due to the losses in the resonant circuit. This cannot be neglected since in many instances, the designer being limited by the available spcae will use a coil with a rather low Q factor. In order to take into account the losses in the resonant circuit, a simple way is to divide R and the expression on the left-hand side of the inequality (2) by a factor $q$ which represents the ratio between the impedance across the non-dissipative resonant circuit and the real impedance across said circuit when the dissipation losses in the coil and the tuning condenser are taken into account and eventually those due to $R_5$. Thus, the optimum maximum value which the ratio between $R_2$ and $R_1$ should not exceed will in fact be smaller than the value derived above.

A rough illustrative design starting with $b=20$, with a collector current of 4 milliamperes, with an available battery voltage of 48 volts, and with a collector to emitter potential drop of 10 volts, the step-up ratio $n$ being equal to the optimum value 2, would lead to a current of 3.79 milliamperes flowing through resistor $R_1$. If it is further assumed that equal voltages of 19 volts are obtained across resistors $R_3$ and $R_1$, the value of resistor $R_1$ would therefore have to be equal to 5020 ohms.

Assuming that coils with a Q factor of 40 are available, and that the apparent Q factor of the resonant circuit is chosen to be equal to 20 for reasons of frequency stability, this implies that the factor $q$ defined above is equal to 2 and this should therefore appear in the denominator of the left-hand expression in (2). Then, with a value of $R_1$ already given above, the maximum value of $R_2$ will be equal to about 11,300 ohms. The impedance afforded by the inductance L at the freqency of resonance will be equal to $R/n^2$ divided by the apparent Q factor of 20. If an operating frequency of 1380 cycles per second is assumed, the above values lead to the inductance L being equal to about 130 millihenries. Therefore, the total inductance of the two windings in series aiding will be equal to 520 millihenries and at the frequency envisaged, the value of the tuning condenser will be about 0.0255 microfarad. In order to keep down the size of the tuning condensers, it is of course advantageous to connect them in shunt with the full winding of the auto-transformers, although tuning to the same frequency may evidently be obtained by using a condenser of four times the value across the winding of inductance L.

In order to further stabilize the operation of the oscillator, it may be found advantageous to derive the D.C. base current from the collector electrode of the transistor. In this case, the top end of resistor $R_4$ instead of being connected to the outer terminal of the oscillator, will be connected to the collector electrode of the transistor.

It should be noted that the above determination of the inductance does not take into account variations of the Q factor with frequency. Of course, the choice of the inductance should be such that at any of the possible oscillation frequencies, the base resistance R should always be sufficiently high to satisfy the oscillation condition.

Figure 2:
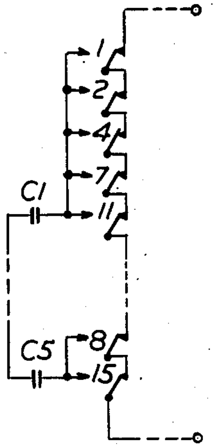
FIG. 2 shows a contact arrangement alternative to that shown in FIG. 1.

While a single break contact $k$ will generally be preferred in order to undo the short-circuit on the two oscillators each time a digital key is depressed, the switching arrangement of FIG. 1 for connecting the tuning condenser with the help of two make contacts per key may eventually be used also to accomplish the function of $k$ by transforming one of these two make contacts into a change-over contact, and this for each key. FIG. 2 shows this particular modification of the circuit of FIG. 1 in which the common contact $k$ is now replaced by all the contacts 1 to 15 forming a closed series circuit when they are in the rest condition corresponding to the break part of the contacts being closed. Then, as any such key is depressed, the short-circuit on the two oscillators is automatically removed at the time one of the condensers $C_{1/5}$ is connected to the oscillator OSC.

Figure 3:
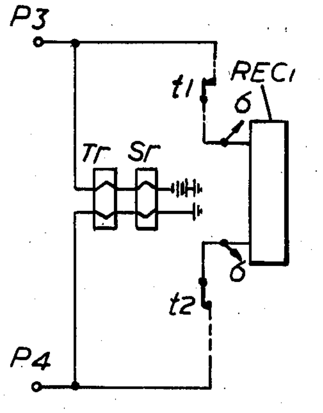
FIG. 3 shows in partial detail, a portion of the receiving equipment cooperating with the transmitting equipment of FIG. 1.

FIG. 3 shows in simplified manner the principle of the receiving equipment at the exchange which may be associated with subset circuits of the type shown in FIG. 1. The input terminals $P_3$ and $P_4$ are respectively connected to a negative battery and to ground through the primary and the secondary windings of the relays $Tr$ and $Sr$, the primary and the secondary windings of these two relays being respectively in series with one another as shown. Relay $Sr$ is the normal supervisory relay which is operated when the loop of the subset is closed upon a call being originated. Relay $Tr$ also operates at such a time, but whereas relay $Sr$ only requires a rather small current to remain energised, relay $Tr$ will release as soon as signalling from the subset takes place. Then, as soon as the loop is closed, the six receivers $REC_{1/6}$ of which only the first is shown in FIG. 3, and which are respectively tuned to the six frequencies which the oscillators may generate, are disconnected from the line since break contacts $t_1$ and $t_2$ are opened. But, as soon as signalling takes place, relay $Tr$ releases and two out of the six receivers may then be operated. The D.C. signal automatically provided as keying takes place, thus affords a very good immunity against spurious signals operating the receivers.

A single supervisory relay $Tr$ may eventually be used provided the supervisory functions of this relay are taken over by the individual relays (not shown) of the tuned receivers. In this way, the single supervisory relay will abandon its supervisory function only during the very short time necessary for the operation of the relays of the tuned receivers. In some circumstances the circuit design will allow this, especially if the tuned receiver relays respond very rapidly. This may be the case for instance if reed relays are used in the tuned receivers, since such relays may operate in a time of the order of 1 millisecond.

It will be observed that the D.C. signal provided with each A.C. signal is substantial, since the normal current in the closed loop may be of the order of 50 milliamperes, whereas it will decrease to 4+4=8 milliamperes during signalling, and assuming a collector current of 4 milliamperes for each transistor. In fact, this collector current may be decreased substantially below the value given, e.g., down to 1 milliampere, since this is desirable to insure that the transistors are operated well under the maximum rated conditions in order to insure long life of the transistors.

While the contact arrangement of FIG. 1 permits to use a short-circuiting connection of the type shown in FIG. 2, if a single $k$ contact is preferred in order to avoid a relatively long chain of break contacts in series, the condensers may be permanently grounded while the two contacts provided with each key may be used to perform the connections to the top ends of the auto-transformers.

Figure 4:
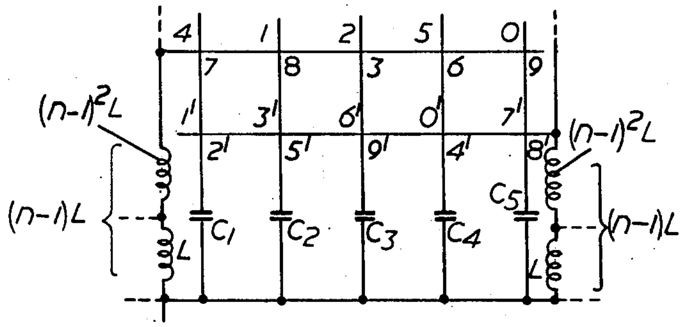
FIG. 4 shows a modification of the selective tuning means shown in FIG. 1.

FIG. 4 shows such an arrangement which affords the considerable advantage that a single set of tuning condensers may be provided in common for the two oscillators. Thus, for a two-out-of-six signalling scheme, only six tuning condensers will now be required instead of ten as shown in FIG. 1. FIG. 4 shows this principle applied to a two out of five signalling scheme, in which case only five condensers $C_{1/5}$ are used. In FIG. 4, all the five condensers are now grounded and the switching takes place between the ungrounded plates of the condensers and the top end of the windings of the two oscillators. The actual contacts have not been shown, but these should be assumed to be make contacts at the points of intersection shown. For example, if the digital key 1 is depressed, condenser $C_1$ will be connected to the right-hand oscillator through make contact 1', while condenser $C_2$ will be connected to the left-hand oscillator through make contact 1 and the two angular frequencies $w_1$ and $w_2$ will thus be simultaneously generated. With the arrangement of the type shown in FIG. 4, the two contacts for each key have no common terminal and in two cases out of four any particular frequency will be generated by one oscillator while in the other two cases it will be generated by the other oscillator. Of course, this scheme of using only a single set of condensers equal to the total number of frequencies can readily be extended to any coding system and in particular those using a constant number of operated elements. Thus, for a two-out-of-six scheme, six condensers will be provided and thirty contacts just as in FIG. 1. The distribution of the make contacts between the cross points formed by the intersection of the vertical conductor leading to the common set of condensers and the horizontal conductors leading to the oscillators, may of course be done in many different ways.

Provided one is prepared to accept at least one particular relation between some of the frequencies used, the number of tuning condensers may even be reduced below the total number of frequencies to be generated. This is due to the fact that the oscillators include a transformer with a step-up ratio which is necessarily greater than unity in view of relation (2). Therefore, a condenser may be connected either across the two windings in series as already shown, or only across the winding of inductance L, and two different oscillation frequencies may then be obtained with the same condenser.

Figure 5:
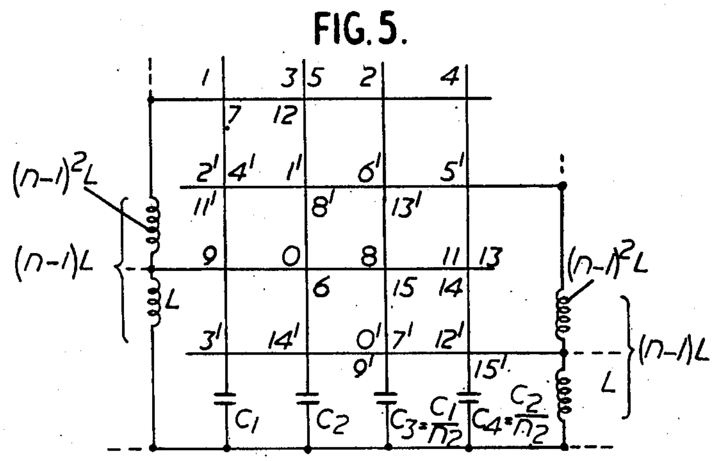
FIG. 5 shows another modification of the selective tuning means shown in FIG. 1.

FIG. 5 shows an example of the use of this principle in order to reduce the number of tuning condensers to only four in the case of a two-out-of-six signalling scheme. With the arrangement shown in this figure, a condenser may not only be connected to one oscillator for one signal and to the other oscillator for another signal, but it may also be connected either on the primary or on the secondary side of the transformers. The six angular frequencies $w_{1/6}$ may be defined by the following relations $$\begin{aligned} w_1^2 &= \frac{1}{n^2LC_1} \\ w_2^2 &= \frac{1}{n^2LC_2} \\ w_3^2 &= \frac{1}{n^2LC_3} = \frac{1}{LC_1} \\ w_4^2 &= \frac{1}{n^2LC_4} = \frac{1}{LC_2} \\ w_5^2 &= \frac{1}{LC_3} \\ w_6^2 &= \frac{1}{LC_4} \end{aligned} \tag{5}$$

For some combinations of frequencies such as $w_1$ and $w_4$ for instance, apart from a trivial interchange of the oscillators, there are two different ways of generating the two frequencies. For the combination of the frequencies $w_3$ and $w_4$, there are even four possible ways of producing this combination. From the relations (5) one immediately obtains $$\begin{aligned} w_3^2 &= w_1w_5 \\ w_4^2 &= w_2w_6 \end{aligned} \tag{6}$$

and $$n^2 = \frac{C_1}{C_3} = \frac{C_2}{C_4} \tag{7}$$

and the first above relation clearly shows that the six frequencies may then be divided in two sets of three, i.e., $w_1$, $w_3$, $w_5$ and $w_2$, $w_4$, $w_6$ which form a geometric progression. Thus, the system imposes two necessary relations between the frequencies used. All the frequencies need not form a geometric progression, and if one has $$C_1 > C_3 > C_2 > C_4 \tag{8}$$

one may use substantially the set of six frequencies previously proposed and which formed an arithmetic progression. The correspondence between the angular frequencies $w_{1/6}$ and the voice frequencies extending from 1380 cycles per second to 1980 cycles per second is given below:

$w_1$, 1380 c.p.s.
$w_3$, 1495 (1500) c.p.s.
$w_5$, 1620 c.p.s.
$w_2$, 1740 c.p.s.
$w_4$, 1856 (1860) c.p.s.
$w_6$, 1980 c.p.s.

Thus, instead of 1500 cycles per second for the second lowest frequency (now $w_3$), in order that (6) should be satisfied, the actual frequency should be 1495 cycles per second. The same is true for the second highest frequency (now $w_4$) which now be slightly different from 1860 cycles per second, i.e., 1856 cycles per second. For such a particular example as the above, $n$ will not of course be much larger than unity and the preferred value of 2 can no longer be used. Nevertheless, in some cases, particularly if $b$ is high, relation (2) could still be satisfied for sufficiently large values of $R_2$. For a given set of 6 frequencies, an increase of $n$ can in fact be secured by making $w_1$, $w_3$, $w_5$ and $w_2$, $w_4$, $w_6$ correspond respectively to the frequencies of odd and even ranks respectively.

Evidently, the scheme of FIG. 5 could also be used for example for a two-out-of-five signalling scheme, but four condensers would still be necessary. However, instead of having two compulsory relations between the frequencies, for a two-out-of-five scheme it would only be necessary to have one of the five frequencies used corresponding to the geometric mean of two other frequencies.

FIG. 5 shows a particular distribution of the thirty make contacts corresponding to the fifteen keys and other distributions of the make contacts among the sixteen crossing points formed by the condensers and the coils, are of course possible, the one shown constituting a rather even distribution of the thiry contacts among the sixteen crossing points.

For some coding schemes, yet a further reduction in the number of tuning condensers could be obtained by using oscillators which are not absolutely identical in the sense that their transformers would differ. This may not be useful in some cases, and in particular for a two out of six signalling scheme this idea would not permit to reduce the number of tuning condensers below four. But for a two-out-of-five signalling scheme the number of condensers may go down to three.

Figure 6:
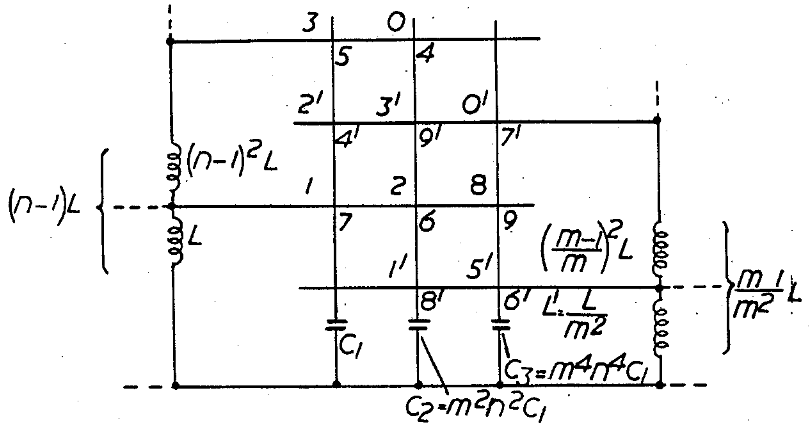
FIG. 6 shows still another modification of the selective tuning means shown in FIG. 1.

FIG. 6 shows an arrangement of this type and it will be seen from the values indicated next to the windings of the two auto-transformers, that different step-up ratios are assumed, equality of step-up ratios being a special case. For the left-hand and for the right-hand oscillators, the step up voltage ratios are respectively equal to $n$ and $m$, but for the right-hand oscillator the lower inductance L' is chosen equal to $L/m^2$ whereby the value of the two inductances of the right-hand auto-transformer, in series aiding is equal to $L_1$ the lower inductance of the left-hand auto-transformer.

A set of relations similar to (5) define the way in which the five possible frequencies are obtained with the three condensers shown in FIG. 6, i.e.

$$
\begin{aligned}
w_1^2&=\frac{1}{LC_1}=\left(\frac{1}{m^2L'C_1}\right)\\
w_2^2&=\frac{1}{n^2LC_1}=\frac{1}{L'C_2}\\
w_3^2&=\frac{1}{LC_2}=\frac{1}{m^2L'C_2}\\
w_4^2&=\frac{1}{n^2LC_2}=\frac{1}{L'C_3}\\
w_5^2&=\left(\frac{1}{LC_3}\right)=\frac{1}{m^2L'C_3}
\end{aligned}
\qquad (9)
$$

Each of the five frequencies as defined above may thus be obtained in two different ways by using one or the other of the two oscillators. These two possibilities for each of the frequencies are essential in order to be able to produce the ten combinations offered by a two out of five scheme. The only exceptions are the angular frequencies $w_1$ and $w_5$, and as may readily be verified, the way of generating $w_1$ defined by the second expression (between brackets) or $w_5$ defined by the first expression (between brackets), e.g., for $w_1$: condenser $C_1$ in shunt across the full winding of the right-hand autotransformer, need not necessarily be used. The use of these possibilities is only of interest in order to be able to have an even distribution of the twenty contacts among the ten effective crosspoints between the conductors leading to the three condensers and those leading to the coils, such as the one shown in FIG. 6. Of course, as is clear from the relations (9) above, and as it appears on FIG. 6, condenser $C_3$ is never in shunt across the full winding of the left-hand autotransformer, while condenser $C_1$ is never in shunt across the winding of inductance $$L'=\frac{L}{m^2}$$

of the right-hand autotransformer. Actually, each of these two connections would produce an additional frequency which could eventually be used in combination either with $w_{1/3}$, or with $w_{3/5}$, or also the two additional frequencies together. Thus, incomplete $$\binom{6}{2} \text{ or } \binom{7}{2}$$

codes permitting respectively $$\binom{5}{2}+3=13 \text{ or } \binom{5}{2}+7=17$$

combinations could be obtained with only three condensers.

From (9) the relation between the various frequencies may readily be obtained, i.e.

$$\frac{1}{L_1C_1}=w_1^2=n^2w_2^2=m^2n^2w_3^2=m^2n^4w_4^2=m^4n^4w_5^2 \qquad (10)$$

from which it is seen that among the possible values of $m$ which will permit to secure five distinct frequencies one may choose $m=n$, i.e., equal step-up ratios for the two auto-transformers, in which case all five frequencies form a geometric progression of ratio $n$. The relations between the condensers and also derived from (9) have been indicated in FIG. 6.

It is obvious that while the invention has been illustrated by two-out-of-five or two-out-of-six signalling schemes, it is not restricted thereto. But, in the case of keysending from subsets, these two schemes are the most interesting since they can provide a sufficient number of distinct signals with a selective number of frequencies out of which only two must be generated at the same time. While this means two oscillators in each subset, the simple designs disclosed above permits to keep both the size and the cost of the equipment down to reasonable values. On the other hand, the simultaneous sending of two frequencies affords a very good safety against false signals.

While the principles of the invention have been described above in connection with specific apparatus, it is to be clearly understood that this description is made only by way of example and not as a limitation on the scope of the invention.

I claim:

1. A telephone signalling system for selectively transmitting voice frequency signals from a remote station to receiving equipment over a two-wire signalling line interconnecting said station and said receiving equipment, said station including voice frequency generating means having a high impedance output and said receiving equipment including voice frequency responsive means, switching means in said station for selectively connecting the said high impedance output of said voice frequency generating means in series with the wires of said line to transmit voice frequency signals over said line and to substantially increase the loop impedance of said line, and switching means in said receiving equipment responsive to the increased loop resistance for connecting said voice frequency responsive means to said line.

2. A telephone signalling system as set forth in claim 1 wherein said voice frequency generating means includes a plurality of oscillators which when connected to said line by said station switching means transmit a combination of voice frequency signals over said line.

3. A telephone signalling system as set forth in claim 2 wherein each of said oscillators includes selective tuning means which are actuated by said station switching means to generate particular predetermined combinations of voice frequencies for transmission over said line.

4. A telephone switching system as set forth in claim 1 wherein the said operation of the switching means to connect the said generating means to the line alters the resistive impedance of said line.

5. A telephone signalling system as claimed in claim 3, characterised in this, that the various predetermined signalling frequencies are used in constant combinations of at least two simultaneous signals of distinct frequencies, and that the frequency bandwidth of these predetermined frequencies is restricted to less than an octave.

6. A telephone signalling system as claimed in claim 3, characterised in this, that said selective tuning means available to select particular predetermined combinations of different voice frequency signals is constituted by sets of tuning condensers, the condensers of each set having one of their plates directly connected to the oscillator corresponding to the set, and the other ends of said condensers being coupled via make contacts of said switch means to a common terminal connected to all the oscillators, so that one tuning condenser out of each set may be selectively connected to a corresponding oscillator to determine the oscillation frequency of the latter, the number of tuning condensers in each set being smaller than the total number of voice frequency signals and there being as many make contacts per frequency combinations as there are oscillators.

7. A telephone signalling system for selectively transmitting voice frequency signals from a remote station to receiving equipment over a two wire signalling line interconnecting said station and said receiving equipment, said station including voice frequency generating means having a high impedance output, said voice frequency generating means comprising a plurality of oscillators, each of said oscillators including a transistor with a resistive emitter load, and with a resistance in series with the primary winding of a step-up transformer connected across said resistive emitter load, the secondary winding of said transformer being coupled to the base of said transistor to obtain a regenerative coupling between emitter and base, the step-up ratio of said transformer from emitter to base being chosen preferably equal to about two, so that said resistance coupling the emitter to said primary winding can be chosen as high as possible while maintaining an oscillatory condition, whereby the D.C. current through the said primary winding is minimized while at the same time the resonant circuit formed by said transformer in conjunction with a parallel tuning condenser is decoupled from said resistive load, said receiving equipment including voice frequency responsive means, switching means in said station for selectively connecting the said high impedance output of said voice frequency generating means in series with the wires of said line to transmit voice frequency signals over said line and to substantially increase the loop impedance of said line, said switching means also actuating said tuning condenser to generate particular predetermined combinations of voice frequencies for transmission over said line.

8. Telephone signalling system as claimed in claim 7, characterised in this, that a direct current connection for biasing the base of said transistor is provided from the collector circuit of said transistor and includes two serially connected resistances one of which being directly connected to said base at one end and being coupled at its other end to a point of fixed potential, to which said emitter load is also connected, through a bypass condenser of sufficient value to prevent an effective alternating current feedback between said collector circuit and said base at the generated frequencies.

9. A telephone signalling system as claimed in claim 8, characterised in this, that said secondary winding is coupled to said base through a coupling condenser, and that said step-up transformer is constituted by an auto-transformer.

10. A telephone signalling system as claimed in claim 9, characterised in this, that said oscillators are connected in parallel and that such parallel combination of the oscillators is serially connected with the microphone circuit of a telephone subset whereby the voice frequency signals from said oscillators will be transmitted in exactly the same way as the speech currents from the microphone, benefit being eventually taken from side tone eliminating circuits, and the voice frequency signalling system being automatically protected against interference from microphone currents due to the high output impedances of said oscillators.

References Cited in the file of this patent

UNITED STATES PATENTS

| | | |
|---|---|---|
| 2,470,145 | Clos | May 17, 1949 |
| 2,554,201 | Lundkvist | May 22, 1951 |
| 2,897,451 | Hammett | July 28, 1959 |
| 2,909,609 | Svala | Oct. 20, 1959 |
| 2,951,911 | Van Lottum et al. | Sept. 6, 1960 |
| 3,011,028 | Boswau | Nov. 28, 1961 |

FOREIGN PATENTS

| | | |
|---|---|---|
| 1,050,835 | Germany | Feb. 19, 1959 |